United States Patent
Rakshit et al.

(10) Patent No.: US 11,158,312 B2
(45) Date of Patent: Oct. 26, 2021

(54) PRESENTING CONTEXTUALLY APPROPRIATE RESPONSES TO USER QUERIES BY A DIGITAL ASSISTANT DEVICE

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 228 days.

(21) Appl. No.: 16/141,119

(22) Filed: Sep. 25, 2018

(65) Prior Publication Data
US 2020/0098358 A1    Mar. 26, 2020

(51) Int. Cl.
| | |
|---|---|
| *G06F 16/00* | (2019.01) |
| *G10L 15/22* | (2006.01) |
| *G10L 15/30* | (2013.01) |
| *G10L 15/18* | (2013.01) |
| *G06F 16/242* | (2019.01) |
| *G06F 16/248* | (2019.01) |
| *G06F 16/2457* | (2019.01) |
| *G06N 3/00* | (2006.01) |

(52) U.S. Cl.
CPC ............ *G10L 15/22* (2013.01); *G06F 16/243* (2019.01); *G06F 16/248* (2019.01); *G06F 16/24575* (2019.01); *G10L 15/1815* (2013.01); *G10L 15/30* (2013.01); *G06N 3/006* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 6,918,039 B1* | 7/2005 | Hind ................... | G06F 21/6218 726/3 |
| 8,321,387 B2* | 11/2012 | Dettinger ............ | G06F 21/6227 707/694 |
| 10,013,979 B1* | 7/2018 | Roman .................... | G10L 15/22 |
| 10,747,894 B1* | 8/2020 | Cline ...................... | G06F 40/35 |
| 2005/0136897 A1 | 6/2005 | Praveenkumar et al. | |
| 2012/0245944 A1* | 9/2012 | Gruber .................. | G10L 15/265 704/270.1 |

(Continued)

OTHER PUBLICATIONS

Mell et al., "The NIST Definition of Cloud Computing", NIST, Special Publication 800-145, Sep. 2011, 7 pages.

*Primary Examiner* — Bai D Vu
(74) *Attorney, Agent, or Firm* — Brian Restauro; Andrew D. Wright; Roberts Calderon Safran & Cole, P.C.

(57) ABSTRACT

A computer-implemented method includes: receiving, by a computing device, a user query; determining, by the computing device, a response to the user query; determining, by the computing device, a sensitivity level of the response; generating, by the computing device, presentation instructions for presenting the response based on the sensitivity level; and presenting, by the computing device, the response in accordance with the presentation instructions.

20 Claims, 8 Drawing Sheets

(56) References Cited

U.S. PATENT DOCUMENTS

| | | | |
|---|---|---|---|
| 2014/0074483 A1* | 3/2014 | van Os | G06F 3/167 |
| | | | 704/275 |
| 2014/0195252 A1 | 7/2014 | Gruber et al. | |
| 2014/0272821 A1* | 9/2014 | Pitschel | G09B 19/06 |
| | | | 434/157 |
| 2017/0358301 A1 | 12/2017 | Raitio et al. | |
| 2018/0213396 A1* | 7/2018 | Segal | G10L 15/1822 |
| 2018/0322380 A1* | 11/2018 | Aggarwal | G06N 20/00 |
| 2019/0392176 A1* | 12/2019 | Taron | G06F 3/167 |

\* cited by examiner

PRESENTING CONTEXTUALLY APPROPRIATE RESPONSES TO USER QUERIES BY A DIGITAL ASSISTANT DEVICE

BACKGROUND

The present invention generally relates to presenting responses to user queries by a digital assistant device and, more particularly, to presenting contextually appropriate responses to user queries by a digital assistant device.

A digital assistant device (also referred to as an "assistant device") is an electronic computing device that performs functions and provides responses to user queries, for example, from user voice input. For example, an assistant device may be a software component in a smart home or smart facility in which the assistant device is wirelessly connected to a network of home automation devices, computers, etc. The assistant device may respond to verbal commands (e.g., "turn off lights") by mapping the verbal command to an electronic command, and sending the corresponding command to a network-enabled device capable of executing the command. Additionally, or alternatively, an assistant device may provide responses to queries by accessing cloud-based systems via wireless networking. An assistant device on a smartphone will typically utilize the speaker to read aloud the response to a query. If the response is long or graphical it may also render a portion of the response on the screen of the smart phone. An assistant device on a smart watch may render the response only in textual form.

SUMMARY

In an aspect of the invention, a computer-implemented method includes: receiving, by a computing device, a user query; determining, by the computing device, a response to the user query; determining, by the computing device, a sensitivity level of the response; generating, by the computing device, presentation instructions for presenting the response based on the sensitivity level; and presenting, by the computing device, the response in accordance with the presentation instructions.

In an aspect of the invention there is a computer program product comprising a computer readable storage medium having program instructions embodied therewith. The program instructions are executable by a computing device to cause the computing device to: receive a user query; determine a response to the user query; determine user environment attributes; generating presentation instructions for presenting the response based on the user environment attributes; and present the response in accordance with the presentation instructions.

In an aspect of the invention a system includes a processor, a computer readable memory and a computer readable storage medium associated with a computing device; program instructions to receive a user query from an assistant device; program instructions to process the user query to determine a response to the user query; program instructions to determine a sensitivity level of the response; program instructions to determine user environment attributes; program instructions to generate presentation instructions for presenting the response based on the sensitivity level and the user environment attributes; and program instructions to provide the presentation instructions to the assistant device to cause the assistant device to present the response in accordance with the presentation instructions. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to presenting responses to user queries by a digital assistant device and, more particularly, to presenting contextually appropriate responses to user queries by a digital assistant device (referred to herein as an "assistant device"). In certain situations, it may be undesirable for answers to user queries to be spoken aloud by an assistant device. For example, confidential information should not be spoken aloud if there are surrounding individuals nearby who may hear the confidential information. Similarly, sensitive information should not be read aloud at full volume in a quiet location, such as in an office or library. As another example, private queries (a query for locating a nearest restroom) should not be responded to aloud as such a verbal response by an assistant device may be embarrassing to the user. Accordingly, aspects of the present invention consider the nature of an assistant device response to a user query and the environment in which the response is being delivered in order to derive the most appropriate presentation to communicate the assistant device response.

As an illustrative non-limiting example, aspects of the present invention determine that the most appropriate manner in which to present or communicate a response by the assistant device is to only provide a textual respond (e.g., on a display of the assistant device or accessory device associated with the assistant device, such as a smart phone, smart watch, external display, etc.). As another example, aspects of the present invention determine that the most appropriate manner in which to present or communicate a response by the assistant device is to provide a verbal response at a relatively low volume, or to provide a verbal response that informs the user that a more complete response is being provided on one of the user's user devices. As another example, aspects of the present invention determine that the most appropriate manner in which to present or communicate a response by the assistant device is to provide a verbal response for non-confidential portions of the response, and to provide a textual response for the confidential portions. Additionally, or alternatively, aspects of the present invention determine any other number or combination of ways to present a response to a user query made to an assistant device with consideration to the sensitivity of the response, user's environment/surroundings, user preferences, and/or other factors (e.g., output audio to a particular accessory device, volume of response, tone/tempo of response, phrasing of the response, etc.).

Aspects of the present invention provide a technical solution to the technical problem of presenting assistant device responses in an appropriate manner. For example, aspects of the present invention provide a specific and technical solution to the above-mentioned technical problem through the use of specific criteria and with consideration to the user's environment, sensitivity of the response, user preferences, and/or other factors. Further, aspects of the present invention improve the functioning of a computing device itself by providing the computing device with a capability not previously possible (e.g., the capability for the assistant device to present responses in appropriate manner with consideration to contextual data, such as data relating to the user's environment, sensitivity of the response, user preferences, and/or other factors).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
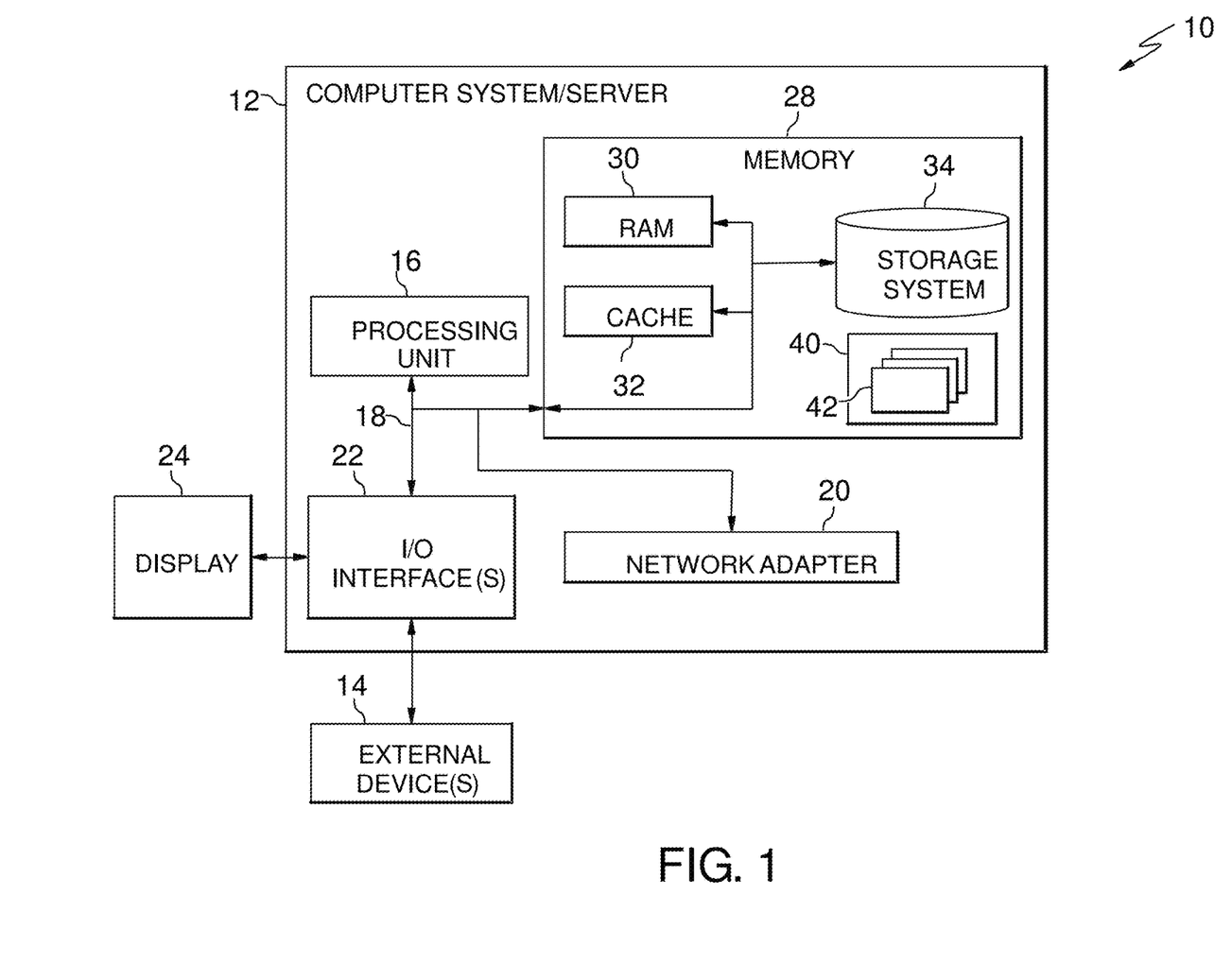
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
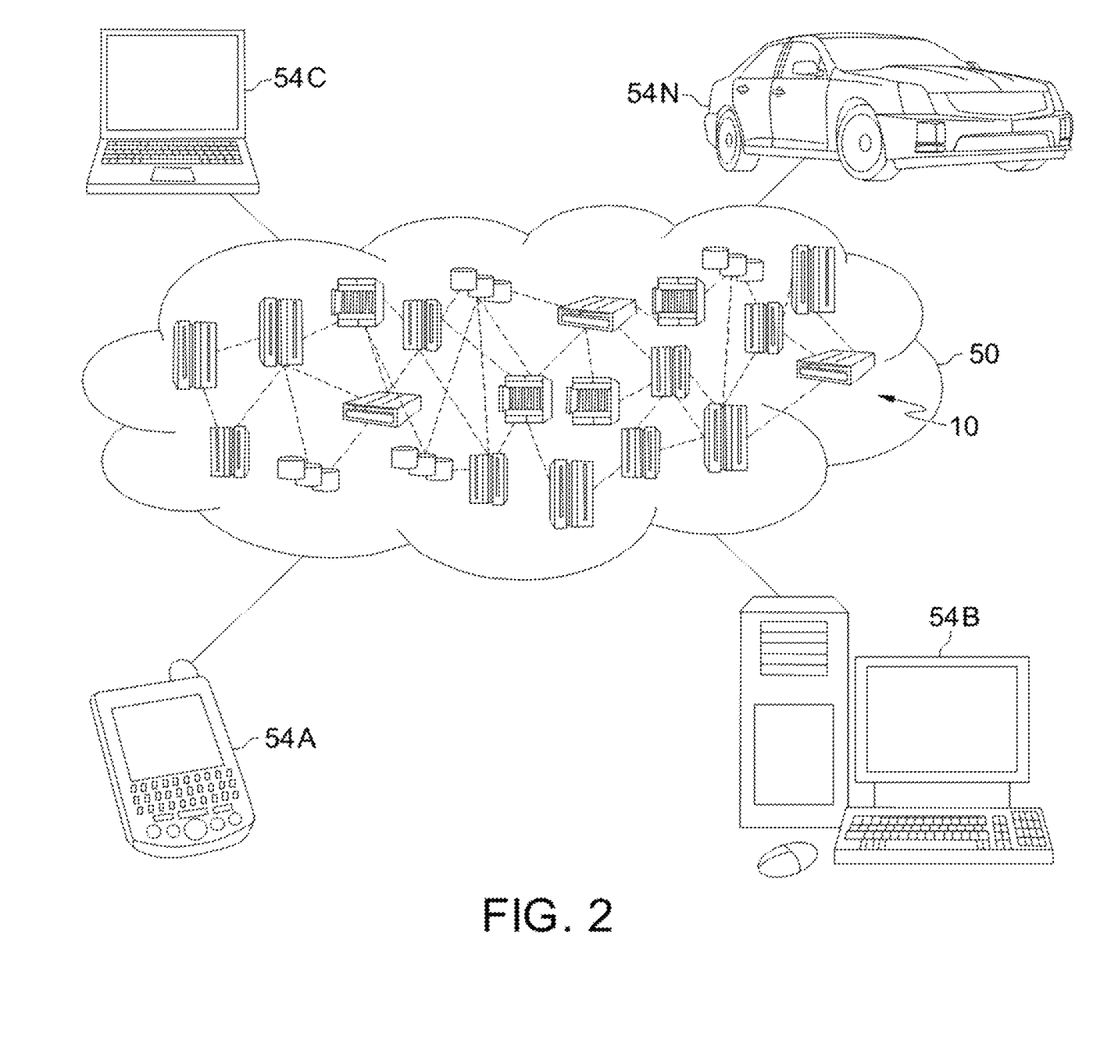
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
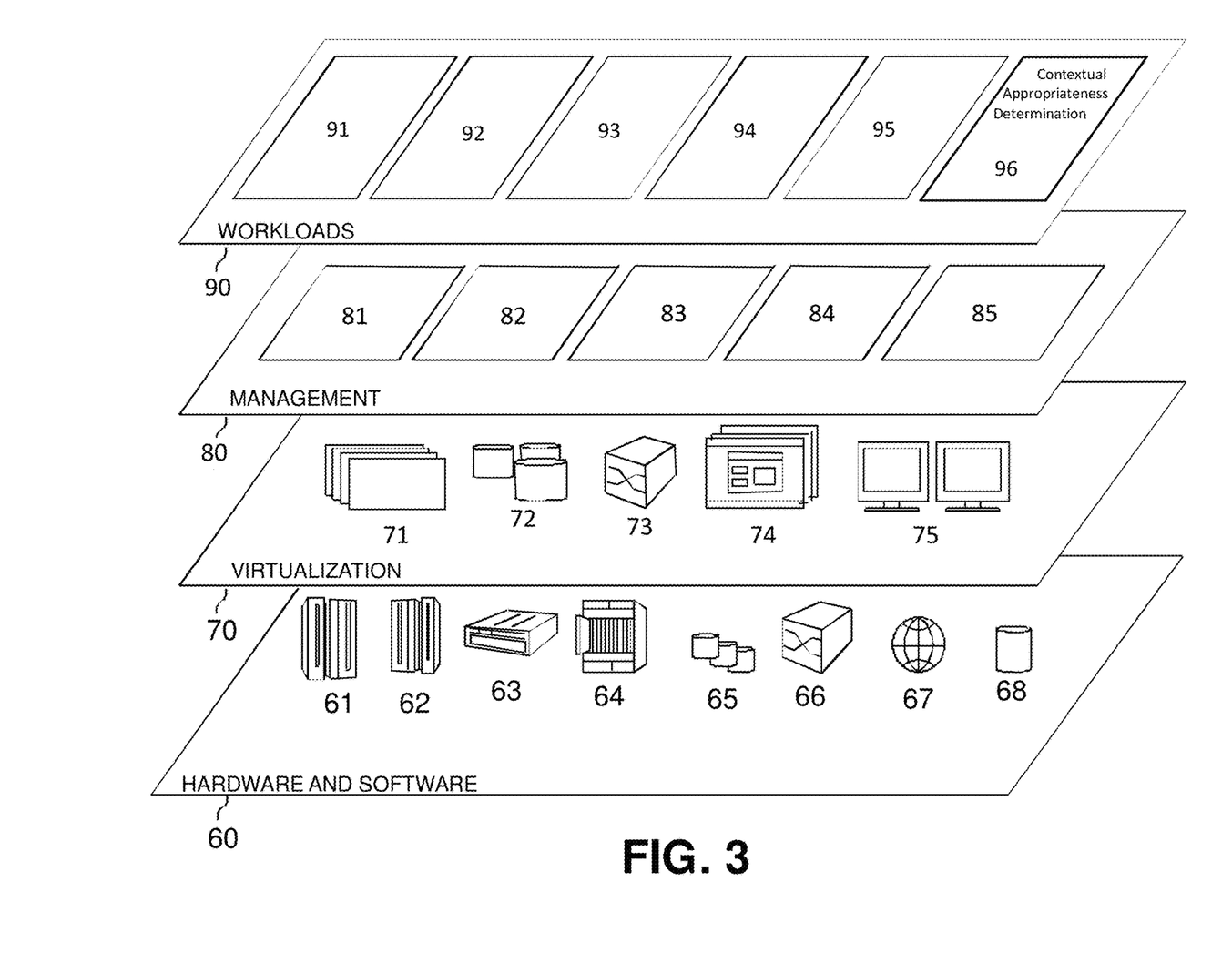
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual appropriateness determination 96.

Referring back to FIG. 1, the program/utility 40 may include one or more program modules 42 that generally carry out the functions and/or methodologies of embodiments of the invention as described herein (e.g., such as the functionality provided by contextual appropriateness determination 96). Specifically, the program modules 42 may receive a user query, process the user query to determine a response, determine a sensitivity level of the response, determine user environment attributes, determine a manner in which to present the query response, and present the query response in the determined manner. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of an assistant device 210 shown in FIG. 4A.

Figure 4A:
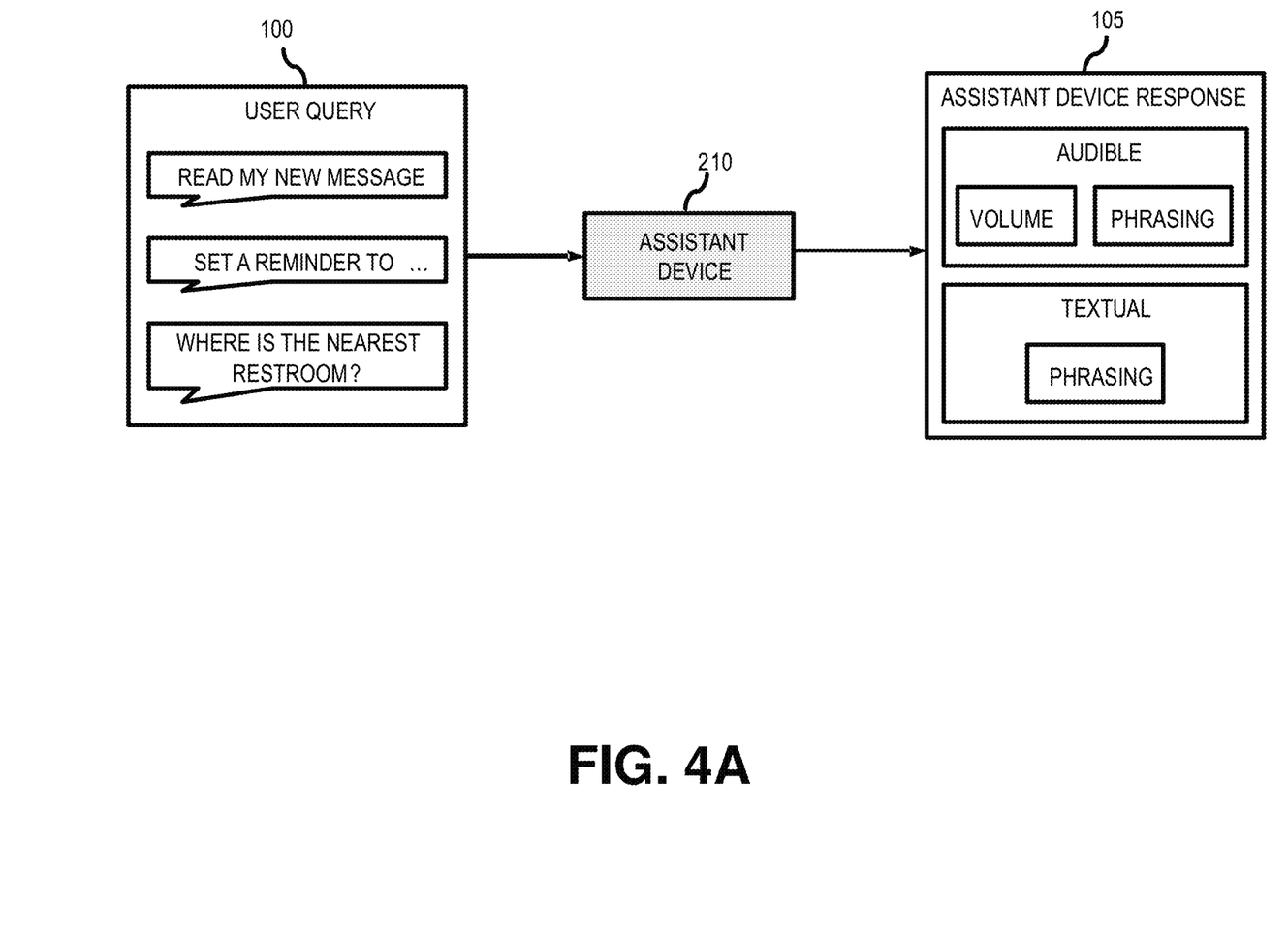
FIGS. 4A and 4B show an overview of an example implementation in accordance with aspects of the present invention.
Figure 4B:
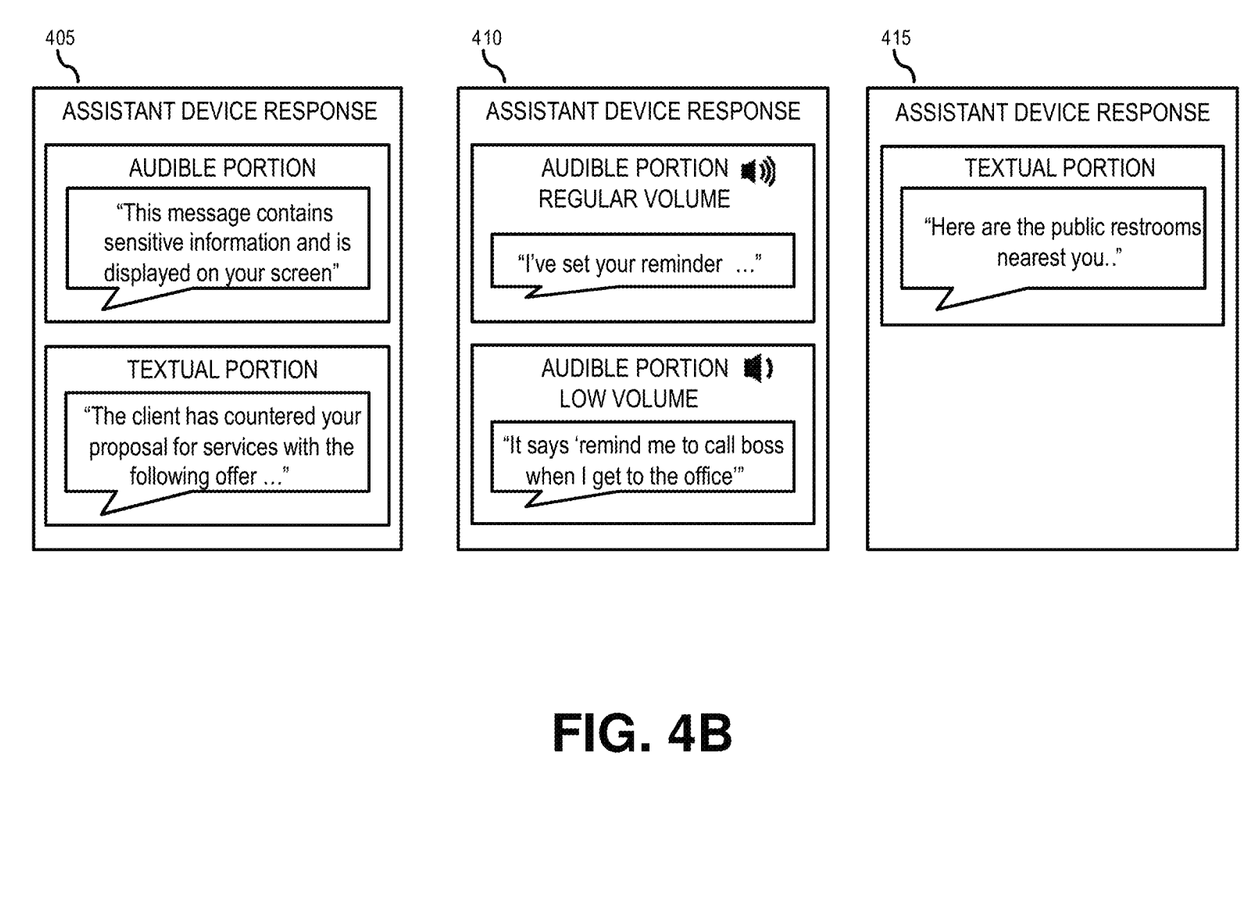

FIGS. 4A and 4B show an overview of an example implementation in accordance with aspects of the present invention. As shown in FIG. 4A, an assistant device 210 receives a user query 100. In embodiments, the user query includes an audible query from a user via a microphone device associated with the assistant device 210, a query inputted via text input on a user interface associated with the assistant device 210, a query that is inputted via barcode/quick-response code scanning, and/or other type of user query). Example user queries 100 are shown in FIG. 4A, however, other user queries may be provided.

Based on receiving the user query 100, the assistant device 210 processes the query, determines a response to the query, and determines a manner in which to present a response to the user query (e.g., based on contextual analysis of the sensitivity of the query response, the user's environment/surroundings, user preferences, etc.). For example, the assistant device 210 provides an assistant device response 105 which includes an audible portion and a textual portion. The audible portion includes a volume to which to speak aloud the response, and the phrasing of the audible response. The textual portion includes text phrased in a certain manner and that is displayed on an associated display of the assistant device 210 and/or display of an accessory device associated with the assistant device 210. As described herein, the assistant device 210 determines the volume and phrasing for the audible portion of the response (or alternatively determines that no audible response should be provide) as well as the phrasing of the textual portion of the response based on the contextual analysis of the sensitivity of the query response, the user's environment/surroundings, user preferences, etc.

FIG. 4B shows example presentations of assistant device responses to the user query 100 in which the presentation is determined based on contextual analysis. As an example, an assistant device response 405 includes an audible portion and textual portion. The audible portion of assistant device response 405 notifies the user that the response to the user's query includes sensitive information and that the response will be provided as a text displayed on a screen associated with the assistant device 210. The textual portion of assistant device response 405 displays the response such that the sensitive information cannot be heard by surrounding individuals.

As another example, and assistant device response 410 includes two audible portions and no textual portions. One audible portion is spoken at one volume level whereas another audible portion is spoken at a different (e.g., lower) volume level (e.g., when it is determined that the second portion of the response may be considered sensitive or private).

As another example, assistant device response 415 includes only a textual portion. For example, the assistant device response 415 includes a textual portion without an audio portion based on determining that the response is of a sensitive or private nature that should not be spoke aloud at all. The examples shown in FIG. 4B are for illustrative purposes, and aspects of the present invention are not limited to these examples.

Figure 5:
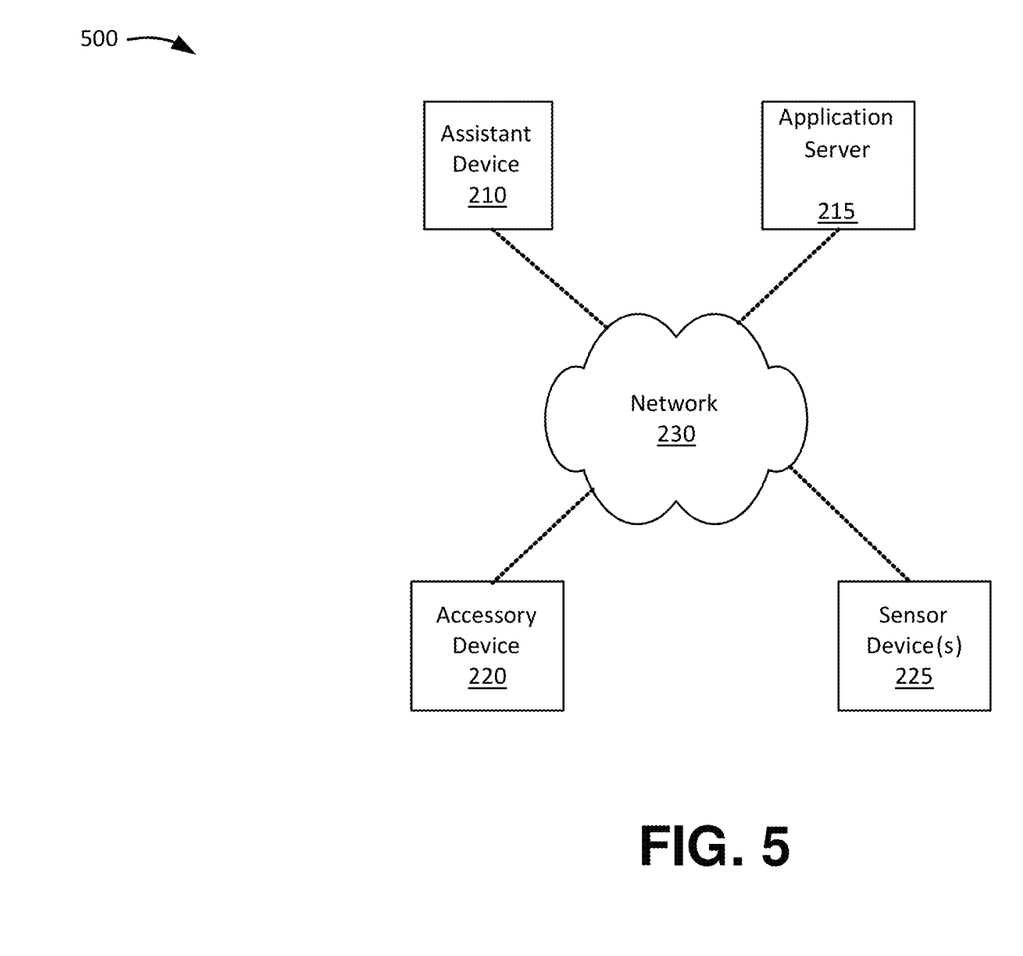
FIG. 5 shows an example environment in accordance with aspects of the present invention.

FIG. 5 shows an example environment in accordance with aspects of the present invention. As shown in FIG. 5, environment 500 includes an assistant device 210, an application server 215, an accessory device 220, one or more sensor devices 225, and a network 230. In embodiments, one or more components in environment 500 may correspond to one or more components in the cloud computing environment of FIG. 2. In embodiments, one or more components in environment 500 may include the components of computer system/server 12 of FIG. 1.

The assistant device 210 includes a computing device capable of communicating via a network, such as the network 230. In example embodiments, the assistant device 210 corresponds to a digital assistant device that receives user queries (e.g., via voice input, text input, barcode/QR scanning, image input, etc.). Example user queries may include a request to read a message, a query for information about a topic, a request to set an alarm/reminder, a request for navigation instructions (e.g., to an address, point of interest, facility, etc.), an instruction to control an automation device, etc.

In embodiments, the assistant device 210 communicates with the application server 215 to generate and receive a response to the query. In embodiments, the assistant device 210 presents the query response in the appropriate manner based on the sensitivity of the query response, user preferences, and/or environmental data (e.g., data from one or more sensor devices 225 in a vicinity of the user, crowd-sourced data in a vicinity of the user, ambient noise data, etc.). Examples for presenting the query response include outputting the response via audio to a particular accessory device 220, outputting the response at a particular volume level, tone, or tempo, phrasing the response in a certain manner, outputting a portion of the response via audio and another portion via text, outputting the entire response by text or audio only, outputting a portion of the response via audio at one volume and another portion at another volume, etc.

The application server 215 includes one or more computing devices (e.g., such as computer system/server 12 of FIG. 1) that receives a user query from the assistant device 210 and processes the user query to determine a response. The application server 215 uses any number of suitable query response determination techniques to process the query and determine the query response.

The accessory device 220 includes a computing device capable of communicating via a network, such as the network 230. In example embodiments, the accessory device 220 corresponds to a mobile communication device (e.g., a smart phone or a personal digital assistant (PDA)), a portable computer device (e.g., a laptop or a tablet computer), a wearable computing device, an external network-enabled display or network-enabled speaker, and/or another type of computing device. In some embodiments, the accessory device 220 communicates with the assistant device 210 to present (e.g., visually and/or audibly) responses to user queries made to the assistant device 210.

The sensor devices 225 include sensors, audio input devices, video input devices, etc. that gather sensor data. As described herein, sensor data is used to determine the environmental surroundings of a user (e.g., ambient noise levels, audio/video data indicating whether surrounding individuals are within a vicinity of the user, etc.). In embodiments, the presentation of a query response is affected based on the environmental surroundings. As an illustrative example, a query response having sensitive/private information would not be spoken aloud via audio when the sensor data gathered by the sensor devices 225 indicates that surrounding individuals are within the vicinity of the user. As another example, a query response would be presented with a lower volume in a quiet facility with low ambient noise, whereas the query response would be presented with louder volume in a louder facility with high ambient noise.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. For example, in embodiments, the operations of the assistant device 210 are incorporated into and performed by the accessory device 220. In other embodiments, the assistant device 210 is a standalone device separate from the accessory device 220. Also, in embodiments, operations relating to determining the appropriate manner in which to present a query response may be performed either by the assistant device 210 or the application server 215. For example, in an example embodiment, the application server 215 determines a response to a user query, performs contextual analysis of the response, determines the appropriate manner in which to present a query response, and provides (e.g., as a service) presentation instructions to the assistant device 210 to direct the assistant device 210 to present the query response in the appropriate manner. In other embodiments, the assistant device 210 locally determines the appropriate manner in which to present a query response and presents the query accordingly. Devices of the environment 500 may interconnect via wired connections, wireless connections, or a combination of wired and wireless connections.

Figure 6:
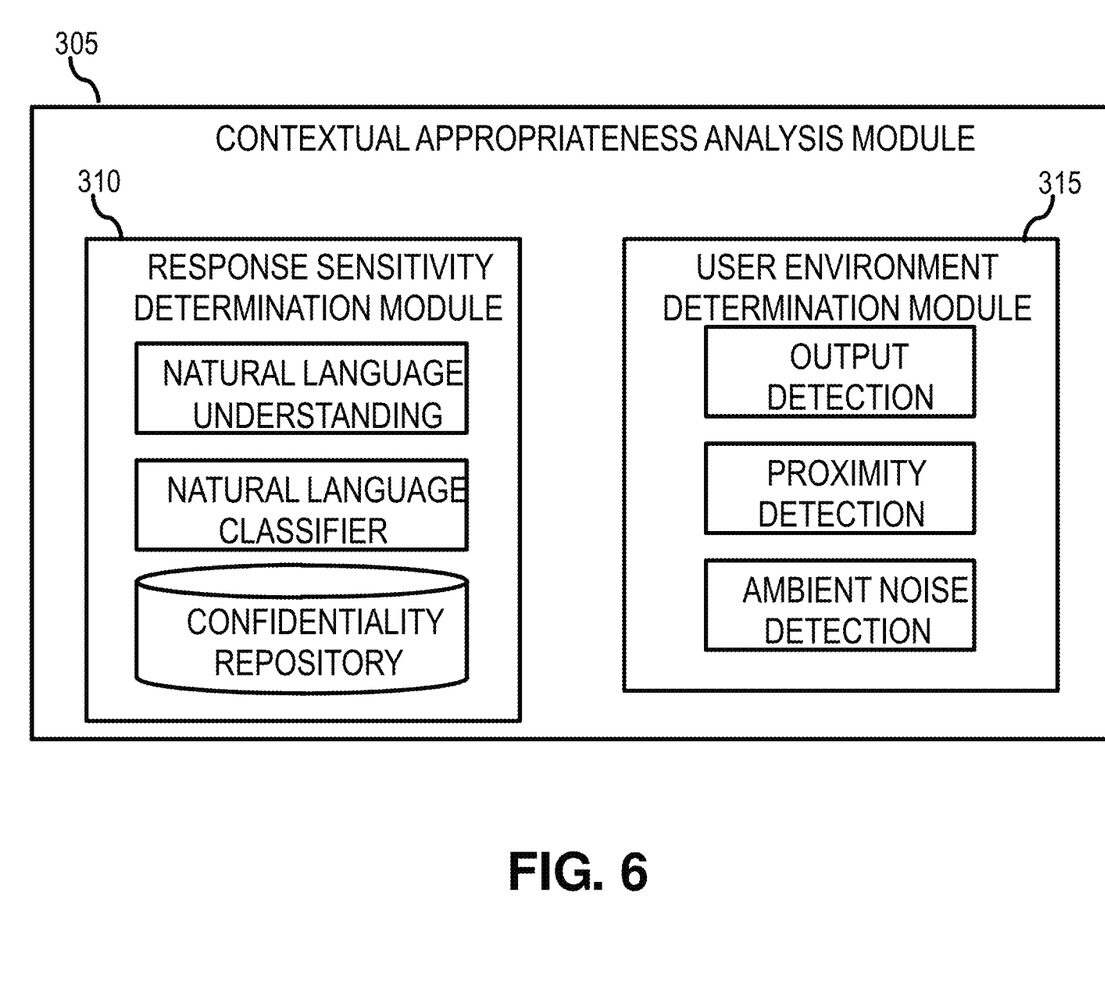
FIG. 6 shows a block diagram of example components of a contextual appropriateness analysis module in accordance with aspects of the present invention.

FIG. 6 shows a block diagram of example components of a contextual appropriateness analysis module in accordance with aspects of the present invention. As shown in FIG. 6, the contextual appropriateness analysis module 305 includes a response sensitivity determination module 310 and a user environment determination module 315. In embodiments, the contextual appropriateness analysis module 305 may include additional or fewer components than those shown in FIG. 6. In embodiments, separate components may be integrated into a single computing component or module. Additionally, or alternatively, a single component may be implemented as multiple computing components or modules. In embodiments, the contextual appropriateness analysis module 305 is incorporated into either the assistant device 210 and/or the application server 215.

The response sensitivity determination module 310 includes include a data storage device and/or program module (e.g., storage system 34 and/or program module 42 of FIG. 1) that determines a sensitivity level of a response (e.g., a response to a user inquiry). In embodiments, the response sensitivity determination module 310 incorporates a natural language understanding service and/or a natural language classifier to determine the sentiment, tone, content, and/or other attributes of the response. In embodiments, the natural language understanding service analyzes text to extract meta-data from content such as concepts, entities, keywords, categories, sentiment, emotion, relations, and semantic roles. The natural language understanding service, in embodiments, distills the content of a response and derives the likelihood that the user would prefer for others not to hear that response, as the response may reveal personal or sensitive information). In embodiments, the natural language classifier analyzes the assistant response to assign a classification to the response. For example, the classification may identify, for example, if the response relates to work, or a personal situation, or is impersonal and not sensitive.

In embodiments, the response sensitivity determination module 310 additionally, or alternatively, includes a confidentiality repository that stores criteria indicating whether a response is considered confidential and/or sensitive. In embodiments, the confidentiality repository also stores data that should not be shared. For example, the confidentiality repository includes a list of topics that are considered confidential. In embodiments, the confidentiality repository includes user defined preferences for what should not be shared. As an example, a user can specify that the assistant device 210 should not share any communications from a particular person or about a particular topic. In embodiments, the natural language understanding service queries the confidentiality repository for instances of confidential content in the assistant response. In embodiments, the response sensitivity determination module 310 derives a sensitivity score indicating a measure of sensitivity of the response based on the information obtained from the natural language understanding service, the natural language classifier, and/or the confidential repository.

The user environment determination module 315 includes include a program module (e.g., program module 42 of FIG. 1) that analyzes the user environment to determine if the response of the assistant device 210 has the potential to be overheard by others (e.g., if the response were read aloud). In embodiments, the operations of the user environment determination module 315 are triggered when the sensitivity score (obtained by the response sensitivity determination module 310) is above a threshold. In embodiments, the user environment determination module 315 performs output detection by determining how the assistant device will output an audible response. For example, the response sensitivity determination module 310 determines, based on the audio output settings of the assistant device 210, whether the response will be played over internal speakers, through headphones, through external wireless/network speakers in a public environment or private environment (e.g., a car), etc.

In embodiments, the user environment determination module 315 further performs proximity detection to determine the presence of surrounding individuals that may be nearby to the assistant device 210. The user environment determination module 315 may use any suitable proximity detection technique for proximity detection, for example, social network/crowdsourced data proximity detection (e.g., to detect nearby social connections), personal area network (PAN) and/or WLAN radio signal analysis e.g., (to detect nearby devices), audio analysis (e.g., to detect the sound of surrounding individuals), visual analysis (e.g., utilizing a camera to detect if individuals are in the vicinity of the assistant device 210).

In embodiments, the user environment determination module 315 performs ambient noise detection (e.g., using a microphone of the assistant device 210) to determine a level of ambient noise in the area. In embodiments, ambient noise levels are used to determine how an audible response from the assistant device 210 will carry (e.g., an audible response spoken in a quiet library will be noisier that one spoken in a busy train station). As described herein, the presentation of a query response is determined based on the level of sensitivity of the response, the proximity detection, and/or the ambient noise detection.

Figure 7:
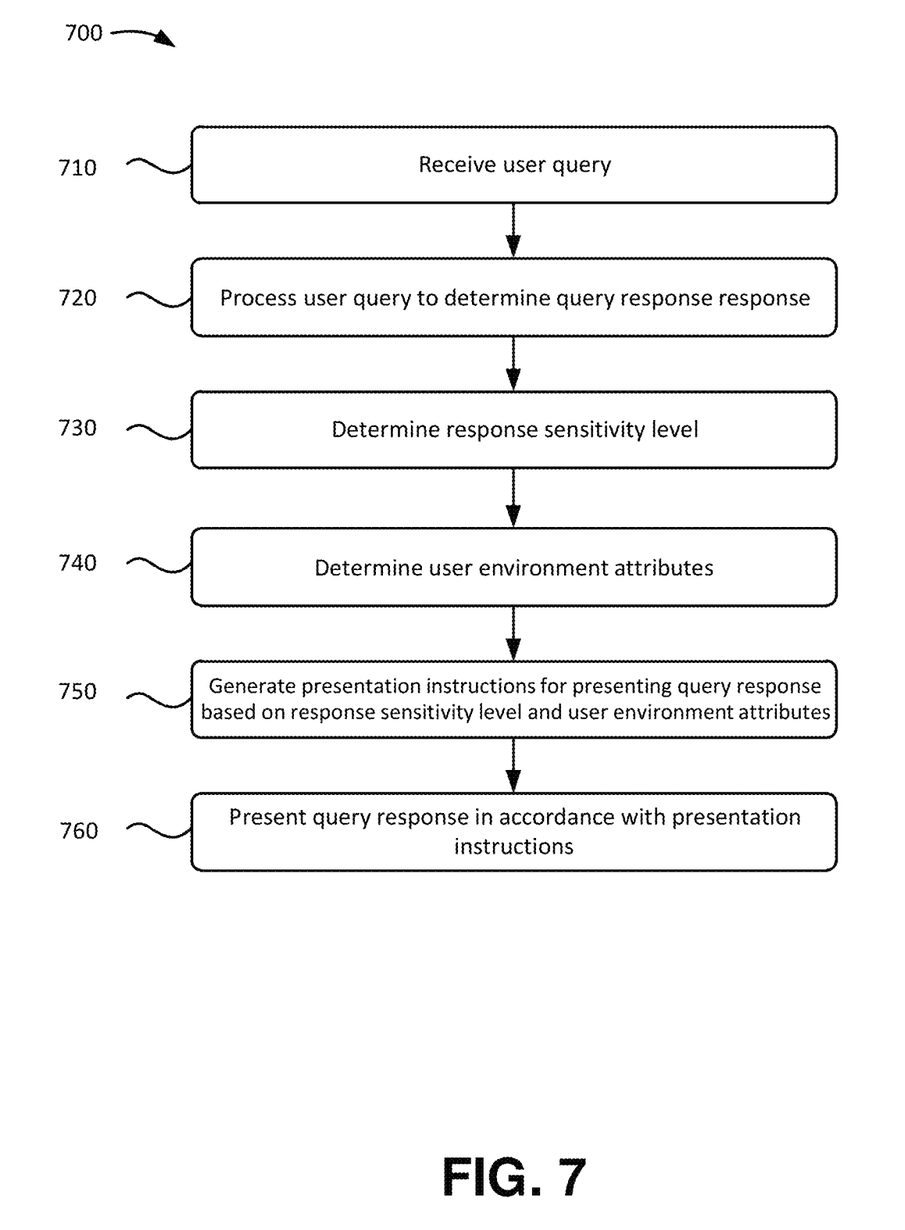
FIG. 7 shows an example flowchart of a process for determining the manner in which to present a query response based on the response sensitivity level and user environment attributes in accordance with aspects of the present invention.

FIG. 7 shows an example flowchart of a process for determining the manner in which to present a query response based on the response sensitivity level and user environment attributes. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 includes receiving a user query (step 710). For example, the assistant device 210 receives a user query from a user (e.g., via voice input, text input, barcode/QR scanning, etc.).

Process 700 also includes process the user query to receive a query response (step 720). For example, the assistant device 210 processes the user query to receive a query response by providing the query to the application server 215. The application server 215 may use any suitable query processing technique to derive a response to the query.

Process 700 further includes determining a response sensitivity level (step 730). For example, as described above with respect to the contextual appropriateness analysis module 305, the assistant device 210 determines a response sensitivity level based on the information obtained from the natural language understanding service, the natural language classifier, and/or the confidential repository.

Process 700 also includes determining user environment attributes (step 740). For example, as described above with respect to the user environment determination module 315, the assistant device 210 determines user environment attributes, such as ambient noise levels and/or information indicating the presence of surrounding individuals are in the vicinity of the user. In embodiments, the assistant device 210 determines the user environment attributes using output detection, proximity detection, and/or ambient noise detection.

Process 700 further includes generating presentation instructions for presenting the query response based on the response sensitivity level and the user environment attributes (step 750). For example, the assistant device 210 generates the presentation instructions by determining the manner in which the response should be presented (e.g., read aloud, presented via text on a display, etc.) In embodiments, the assistant device 210 determines any number or combination of ways to present the response with consideration to the sensitivity of the response, the user's environment/ surroundings, user preferences, and/or other factors. For example, the assistant device 210 determines that a particular audio output device should speak the response (e.g., through internal speakers, headphones only, a specific external wireless speaker, etc.). Additionally, or alternatively, the assistant device 210 determines the volume of response, tone/tempo of response, phrasing of the response, a portion of the response to read aloud, etc. In embodiments, the assistant device 210 determines the manner in which to present the query response (and the corresponding presentation instructions) based on a set of specific criteria that maps the sensitivity level, type of response, content of the response, environment attributes and/or other factors to the response presentation. As an example, one criteria may indicate that response should only be presented in text and not audio when the response has a particular sensitivity level, is of a particular type, and when surrounding individuals are nearby. In embodiments, the presentation of the response is determined based on a ratio of the sensitivity level to the user environment attributes.

In alternative embodiments, the assistant device 210 determines the presentation of the response based on the sensitivity level, regardless of the user environment, or vice versa. For example, in an embodiment, the assistant device 210 determines that a response having a sensitivity level exceeding a certain threshold should not be read aloud, regardless of the user's environment/surroundings. In another embodiment, the assistant device 210 determines that a response should not be read aloud, or should not exceed a certain volume level (regardless of the sensitivity level of the response) based on the user's geographic location (e.g., the response should not be read aloud when the user is in a quiet setting, such as a library as determined by geographic location and/or the ambient noise levels). Additionally, or alternatively, in an example embodiment, the assistant device 210 determines that a response should not be read aloud based on calendar information indicating that the user may be busy (e.g., in a meeting, appointment, etc.). In an example embodiment, the assistant device 210 may generate presentation instructions to present the response in a default manner in accordance with default settings when the sensitivity level is below a threshold.

Process 700 also includes presenting the response in accordance with the presentation instructions (step 760). For example, the assistant device 210 presents the response in accordance with the presentation instructions (e.g., generated at step 750). Examples of different types of response presentations are described herein and shown in FIG. 4B. In this way, the assistant device 210 presents the response in a manner that prevents sensitive information from being read aloud when there is a risk that a surrounding individual may hear the sensitive information. Further, the assistant device 210 presents the response in a manner that allows the response to be read aloud when either sensitive information is present but other individuals are not in the vicinity to hear the response, or when the response does not include sensitive information.

In an alternative embodiment, the application server 215 performs steps 710-750. In this embodiment, the application server 215 generates the presentation instructions at step 750 after performing steps 710 and provides the presentation instructions to the assistant device 210 to direct the assistant device 210 to present the response based on the response sensitive level and user environment attributes. The assistant device 210 receives and executes the presentation instructions to present the query in the manner determined by the application server 215.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, a user query;
   determining, by the computing device, a response to the user query;
   determining, by the computing device, a sensitivity level of the response;
   determining, by the computing device, a type of presentation method to use for the response based on the sensitivity level of the response, wherein types of presentation methods include a visual method, an audible method, and a combined visual and audible method, wherein the response is presented in a manner that prevents sensitive information from being communicated to others;
   generating, by the computing device, presentation instructions regarding how the response is to be presented to the user based on the determining the type of presentation method to use for the response; and
   presenting, by the computing device, the response to the user via one or more computer-generated visual responses, one or more computer-generated audio responses, or a combination of computer-generated visual and audio responses in accordance with the presentation instructions.

2. The computer-implemented method of claim 1, wherein the generating the presentation instructions is based on mapping the sensitivity level to information identifying a manner in which to present the response.

3. The computer-implemented method of claim 1, wherein the sensitivity level is determined based on at least one selected from the group consisting of:
   a natural language understanding service;
   natural language classification; and
   a confidentiality repository.

4. The computer-implemented method of claim 1, wherein the user query is received via at least one selected from the group consisting of:
   voice input;
   text input;
   image input; and
   code scanning.

5. The computer-implemented method of claim 1, wherein the determining the response comprises communicating with an application server to process the user query and receive the response from the application server.

6. The computer-implemented method of claim 1, wherein the presentation instructions include instructions to present the response in a default manner in accordance with default settings when the sensitivity level is below a threshold.

7. The computer-implemented method of claim 1, wherein the presentation instructions include at least one selected from the group consisting of:
   instructions to speak the response aloud at a particular volume or tone;
   instructions to speak the response aloud via a particular audio output device;

instructions to speak a portion of the response aloud;
instructions for phrasing the response; and
instructions to present the response in text format.

8. The computer-implemented method of claim 1, further comprising determining user environment attributes, wherein the generating the presentation instructions is further based on the user environment attributes.

9. The computer-implemented method of claim 8, wherein the user environment attributes include at least one selected from the group consisting of:
ambient noise level; and
information indicating the presence of surrounding individuals.

10. The computer-implemented method of claim 1, wherein a service provider at least one of creates, maintains, deploys and supports the computing device.

11. The computer-implemented method of claim 1, wherein the receiving the user query, the determining the response to the query, the generating the presentation instructions, and the presenting the response are provided by a service provider on a subscription, advertising, and/or fee basis.

12. The computer-implemented method of claim 1, wherein the computing device includes software provided as a service in a cloud environment.

13. The computer-implemented method of claim 1, further comprising deploying a system comprising providing a computer infrastructure operable to perform the receiving the user query, the determining the response to the query, the generating the presentation instructions, and the presenting the response.

14. A computer program product comprising a computer readable storage medium having program instructions embodied therewith, the program instructions executable by a computing device to cause the computing device to:
receive a user query;
determine a response to the user query;
determine user environment attributes;
determine whether to present the response to a user visually, audibly, or visually and audibly based on the user environment attributes in a manner that prevents sensitive information from being communicated to others;
generating presentation instructions regarding how the response is to be presented to the user visually, audibly, or visually and audibly, based on the determining whether to present the response to the user visually, audibly, or visually and audibly; and
present the response to the user via one or more computer-generated visual responses, one or more computer-generated audio responses, or a combination of computer-generated visual and audio responses in accordance with the presentation instructions.

15. The computer program product of claim 14, wherein the user environment attributes include at least one selected from the group consisting of:
ambient noise level; and
information indicating the presence of surrounding individuals.

16. The computer program product of claim 15, wherein the information indicating the presence of surrounding individuals includes at least one selected from the group consisting of:
social network information;
crowdsourced data;
personal area network radio signal data;
wireless local area network radio signal data; and
visual data from a camera device.

17. The computer program product of claim 14, wherein the determining the response comprises communicating with an application server to process the user query and receive the response from the application server.

18. The computer program product of claim 14, wherein the presentation instructions include instructions to speak a portion of the response aloud, wherein the portion of the response comprises a notification that the response includes sensitive information; and
instructions to present another portion of the response in text format, wherein the other portion comprises the sensitive information.

19. A system comprising:
a processor, a computer readable memory and a computer readable storage medium associated with a computing device;
program instructions to receive a user query from an assistant device;
program instructions to process the user query to determine a response to the user query;
program instructions to determine a sensitivity level of the response;
program instructions to determine user environment attributes;
program instructions to determine whether to present the response to a user visually, audibly, or visually and audibly based on the sensitivity level and the user environment attributes in a manner that prevents sensitive information from being communicated to others, wherein the response is presented visually and audibly when the sensitivity level indicates sensitive content, with a portion of the response including the sensitive content being presented visually to the user and a non-sensitive portion of the response being presented audibly to the user;
program instructions to generate presentation instructions regarding how the response is to be presented to the user based on the determination whether to present the response to the user visually, audibly, or visually and audibly; and
program instructions to provide the presentation instructions to the assistant device to cause the assistant device to present the response to the user via one or more computer-generated visual responses, one or more computer-generated audio responses, or a combination of computer-generated visual and audio responses in accordance with the presentation instructions,
wherein the program instructions are stored on the computer readable storage medium for execution by the processor via the computer readable memory.

20. The system of claim 19, wherein:
the user environment attributes include at least one selected from the group consisting of:
ambient noise level; and
information indicating the presence of surrounding individuals.

* * * * *